United States Patent [19]

Schröder

[11] 4,035,864

[45] July 19, 1977

[54] LOCKABLE CASTER, MORE PARTICULARLY SWIVEL CASTER

[75] Inventor: Klaus Dieter Schröder, Wermelskirchen, Rheinland, Germany

[73] Assignee: Firm Tente-Rollen Gesellschaft mit beschrankter Haftung Companie, Wermelskirchen, Rheinland, Germany

[21] Appl. No.: 596,046

[22] Filed: July 15, 1975

[30] Foreign Application Priority Data

Nov. 30, 1974  Germany .................... 7439939[U]

[51] Int. Cl.$^2$ .......................................... B60B 33/00
[52] U.S. Cl. .................................. 16/35 R; 188/1 D
[58] Field of Search ................ 16/35 R; 280/33.99 C; 188/1 D

[56] References Cited

U.S. PATENT DOCUMENTS

| 2,707,794 | 5/1955 | Kramcsak, Jr. ............... | 188/1 D |
| 2,709,828 | 6/1955 | Noelting et al. ............... | 188/1 D |
| 2,972,163 | 2/1961 | Ross et al. .................... | 188/1 D |
| 3,162,888 | 12/1964 | Mobus ........................... | 16/35 R |
| 3,571,842 | 3/1971 | Fricke ........................... | 16/35 R |
| 3,751,757 | 8/1973 | Stosberg et al. ............... | 16/35 R |
| 3,772,733 | 11/1973 | Stosberg et al. ............... | 16/35 R |
| 3,890,669 | 6/1975 | Reinhards ..................... | 16/35 R |

FOREIGN PATENT DOCUMENTS

| 1,505,319 | 11/1967 | France ........................ | 16/35 R |
| 279,090 | 2/1970 | Germany ..................... | 16/35 R |
| 1,932,802 | 9/1965 | Germany ..................... | 16/35 R |

*Primary Examiner*—Werner H. Schroeder
*Assistant Examiner*—Conrad L. Berman
*Attorney, Agent, or Firm*—Burgess, Dinklage & Sprung

[57] ABSTRACT

A lockable caster, more particularly a swivel caster, having a locking device for locking the running wheel to prevent it from running and/or to prevent the caster-fork from swivelling. In the cavity of the caster-fork is disposed an expanding toggle which takes the form of a foot-operated control lever, which is pivotally mounted in a socket, and is guided by a guide lug in a guide slot. On the trailing side of the caster, the expanding toggle is pivotally mounted below the fork back in a socket of a resilient or spring-loaded locking rocker. The fork back and locking rocker enclose the expanding toggle between themselves with prestressing. The guide slot may be disposed in the rear portion of the caster-fork. The guide lug takes the form of a resetting cam which in the locking position extends out of the guide slot to form a foot-operated cam to tilt the expanding toggle back into its release position.

In an embodiment the back portion of the caster-fork is inclined downwards on the trailing side of the caster and its guide slot forms an inclined slideway over which the resetting cam can shoot back into the release position of the expanding toggle.

8 Claims, 6 Drawing Figures

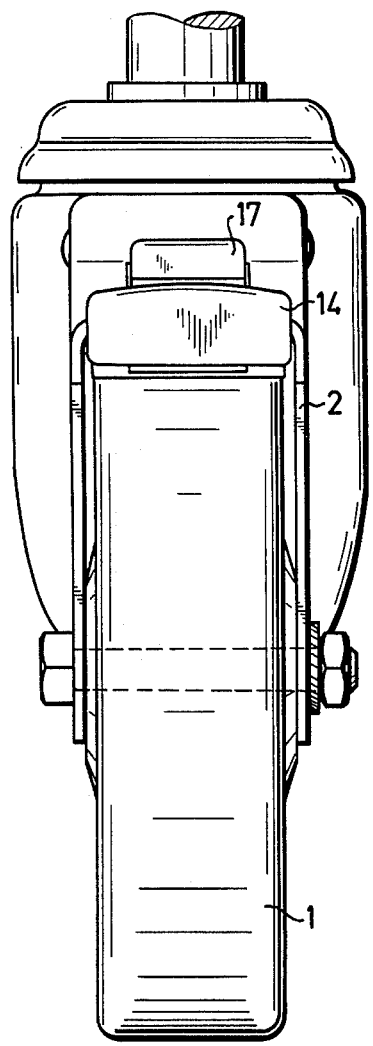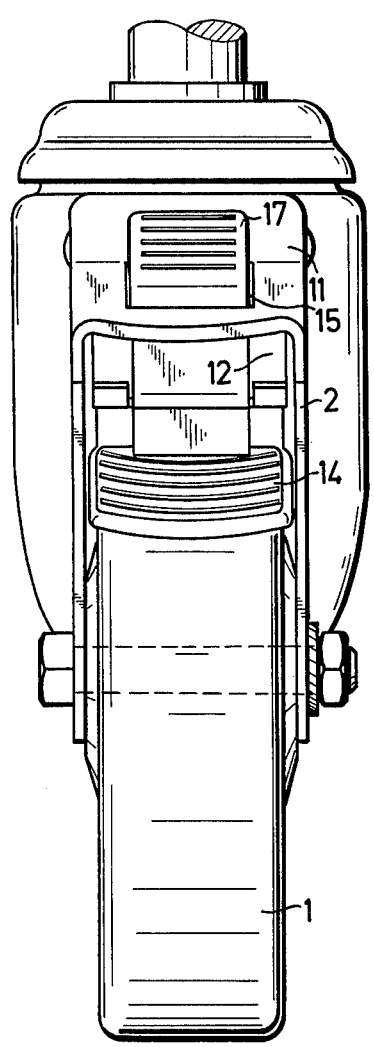

LOCKABLE CASTER, MORE PARTICULARLY SWIVEL CASTER

The invention relates to a caster having a locking device for locking the running wheel. If it is a stationary caster, the locking device serves to lock the running wheel to prevent it from running. If it is a swivel caster with a pivotable running wheel, the locking device can instead be provided for locking the swivelling motion of the caster-fork and therefore of the running wheel. In the case of a swivel caster, however, the locking device can also be used for locking both the rotation of the running wheel and the swivelling motion of the caster-fork and therefore of the running wheel.

The casters, more particularly swivel casters of the kind specified, the locking device contains a locking member which is usually mounted in the fork cavity and which to lock the swivelling motion of the running wheel is suitably pressed against the wheel tire, and/or which to lock the pivoting movement of the wheel-fork is brought into engagement, for instance, with a tooth system of a fixed ball bearing shell of the caster holder. The locking member which, for instance, can be a strong leaf-spring, can, in the known embodiments, be moved as required into its locking position and then back into its release position by means of a foot-operated control lever provided on the caster.

The U.S. Pat. No. 3,162,888 for which the application (Ser. No. 202,443) was filed on the June 14, 1962, and the German Patent Specification No. 1,303,706 discloses a caster in which the locking member is a spring clip which is bent in the shape of a wedge from a leaf-spring and is mounted at its apex in the cavity of the caster-fork, its expandable arms enclosing between themselves with prestressing an expanding toggle which takes the form of a foot-operated control lever, is pivotably mounted in a socket of the lower arm of the spring clip, and is guided by a guide lug in a guide slot in the top arm of the spring clip. The locking member is actuated by the tip of the foot, the foot-operated control lever being depressed to lock the caster and raised again by the tip of the foot for unlocking.

However, it is laborious to have to raise the foot-operated control lever again by the tip of the foot, and more particularly in the case of hospital furniture, such as patients' beds, which have lockable casters of the kind specified, results in damage to the lightweight footwear worn more particularly by female hospital staff. Moreover, for reasons of space, a pivotable locking member of this kind consisting of a wedge-shaped spring clip can be accommodated in the fork cavity only on the leading side of the caster, which is inconvenient for operation, since as a result the foot-operated control levers extend forwardly in the direction of travel and may, for instance, in the case of patients' beds, damage the wall against which the bed is pushed by its head end.

German Utility Model Specification No. 1,932,802 discloses a caster having on its trailing side a casing-like bearing block riveted on to the caster-fork and accommodating a ratchet wheel system having a foot-operated control lever; by depressing the lever the ratchet wheel system can be turned on by one tooth to lock or release alternately the locking member mounted in the fork cavity. However, a special bearing casing of this kind makes the caster look unattractive, and this is an important aspect if it is to be used as a lockable furniture or apparatus caster.

Prior art locking devices of this kind, disposed on the trailing side of the caster, require more particularly high precision in the ratchet mechanism or pressure-changing or other locking mechanism substituted therefor, and this is too expensive for many applications of casters. It has also been found in practice that the relatively short operating travel of high precision ratchet or pressure-changing mechanisms is not always adequate to bridge relatively large manufacture and assembly tolerances in the caster and its running wheel. This disadvantage often applies to relatively large casters such as, for instance, casters for conveying implements.

It is an object of the invention to obviate the disadvantages of the prior art lockable casters and to provide a caster whose locking device consists of only a few parts and is very simple; the caster is cheap to manufacture and assemble, even though so simple requires no raising of the foot-operated control lever by the tip of the foot for unlocking, can also be disposed if required due to lack of space on the convenient trailing side of the caster and can be accommodated in such a way as to have a pleasing appearance.

To this end the invention starts from a fully lockable caster as disclosed in German Patent Specification No. 1,303,706 and whose foot-operated control lever must be raised by the tip of the foot.

The caster according to the invention, which can more particularly be a swivel caster, and which has a locking device for locking the running wheel to prevent it from running and/or the pivoting motion of the caster-fork and in which there is disposed in the cavity of the caster-fork an expanding toggle which takes the form of a foot-operated control lever, is pivotally mounted in a socket and guided by a guide lug in a guide slot, is characterised according to the basic idea of the invention in that the guide slot is disposed in the rear portion of the caster-fork, and the guide lug takes the form of a resetting cam which in the locking position extends out of the guide slot to form a foot-operated cam to tilt the expanding toggle back into its release position.

An advantageous further development of the basic idea of the invention is characterised in that on the trailing side of the caster the expending toggle is pivotally mounted below the fork back in a socket of a resilient or spring-loaded locking rocker, and the fork back and locking rocker enclose the expanding toggle between themselves with prestressing.

Conveniently, if the expanding toggle is disposed on the trailing side of the caster, the back portion of the castor-fork is inclined downwards on the trailing side of the caster and its guide slot forms an inclined slideway over which the resetting cam can shoot back into the release position of the expanding toggle.

Advantageously, the expanding toggle and/or its resetting cam have a strip-like thickened portion which in the release position of the expanding toggle fills and closes the guide slot in the back portion of the caster-fork.

The invention provides a very simple locking device consisting of only a few parts and ensures simple assembly and uncomplicated, reliable operation. In spite of its simplicity, the invention enables the "locking" or "release" positions each to be adjusted by the pressure of the foot, without the foot-operated control lever having to be raised by the tip of the foot for unlocking. The invention provides long operative travel and satisfactory force transmission in the locking device. When suitably constructed, the invention affords a relatively large free space between the operating plane, in which the caster is disposed on the piece of furniture, apparatus or the like, and the foot-operated control lever and its resetting cam, a feature which substantially facilitates operation.

In the drawings, illustrating diagrammatically an embodiment of the invention in the form of a fully lockable caster with attaching pin:

FIG. 3 is a view of the trailing side of the caster illustrated in FIG. 1.

FIG. 6 is a view of the trailing side of the caster illustrated in FIG. 4 in the locked condition.

Figure 1:
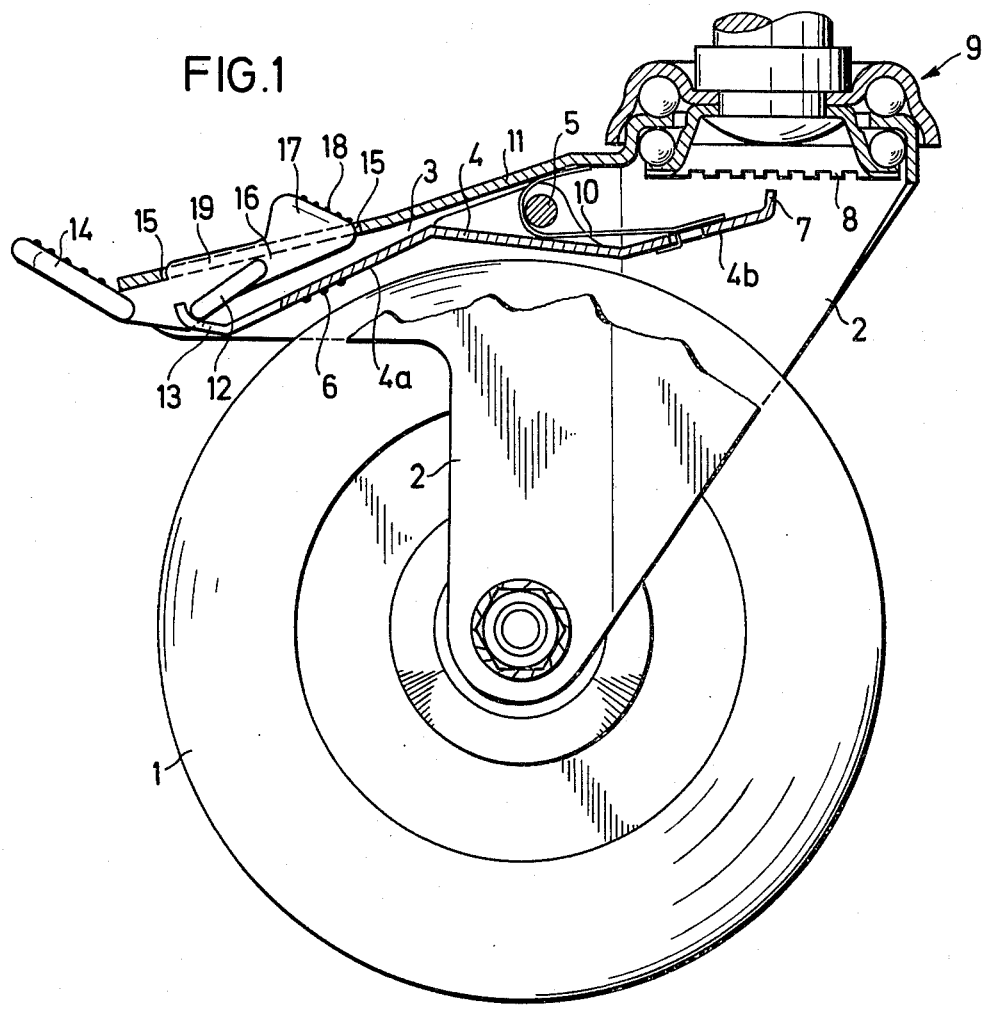
FIG. 1 is a partially sectioned view of the unlocked caster in the running and pivotable condition.

In the embodiment illustrated, the caster has a locking device for both locking the running wheel 1 to prevent it from running and for locking the swivelling motion of the caster-fork 2. To this end a two-sided locking rocker 4, in this embodiment pressed from strong sheet metal and pivotably mounted via a transverse pivot 5 in the caster-fork 2, is accommodated in the cavity 3 thereof. One arm 4a of the locking rocker 4 has raised ridges 6 pointing downwards which press against the tire of the running wheel 1 to decelerate its movement. The other arm 4b of the locking rocker 4 has an upwardly bent strip 7 for engaging in the base toothing of a fixed ball bearing shell 8 of back bearing 9, to lock the swivelling movement of the caster-fork 2 and therefore of the running wheel 1. The locking rocker 4 is spring loaded by a leaf-spring 10, which is bent in this embodiment, and acts as an unlocking spring always tending to pivot the locking rocker 4 into its release position. However, the locking rocker 4 might also be resilient due to being made from spring steel. It could also take the form of a one-sided rocking lever and be used either exclusively for locking the running wheel 1 to prevent it from running or exclusively for locking the swivelling movement of the caster-fork 2.

On the trailing side of the caster, an expanding toggle 12 is pivotally mounted in a socket 13 of the locking rocker 4 in the hollow 3 of the caster-fork 2 below the fork back 11. Due to the spring loading of the locking rocker 4 by the unlocking spring 10, the fork back 11 and the locking rocker 4 enclose the expanding toggle 12 between themselves with prestressing. In this embodiment, the expanding toggle 12 is constructed unitarily with a foot-operated control lever 14 which can be depressed by the tip of the foot to press the rocker arm 4a against the running wheel 1 to rock it, and move the strip 7 of the rocker arm 4b into locking engagement with the toothed ball bearing shell 8.

Figure 4:
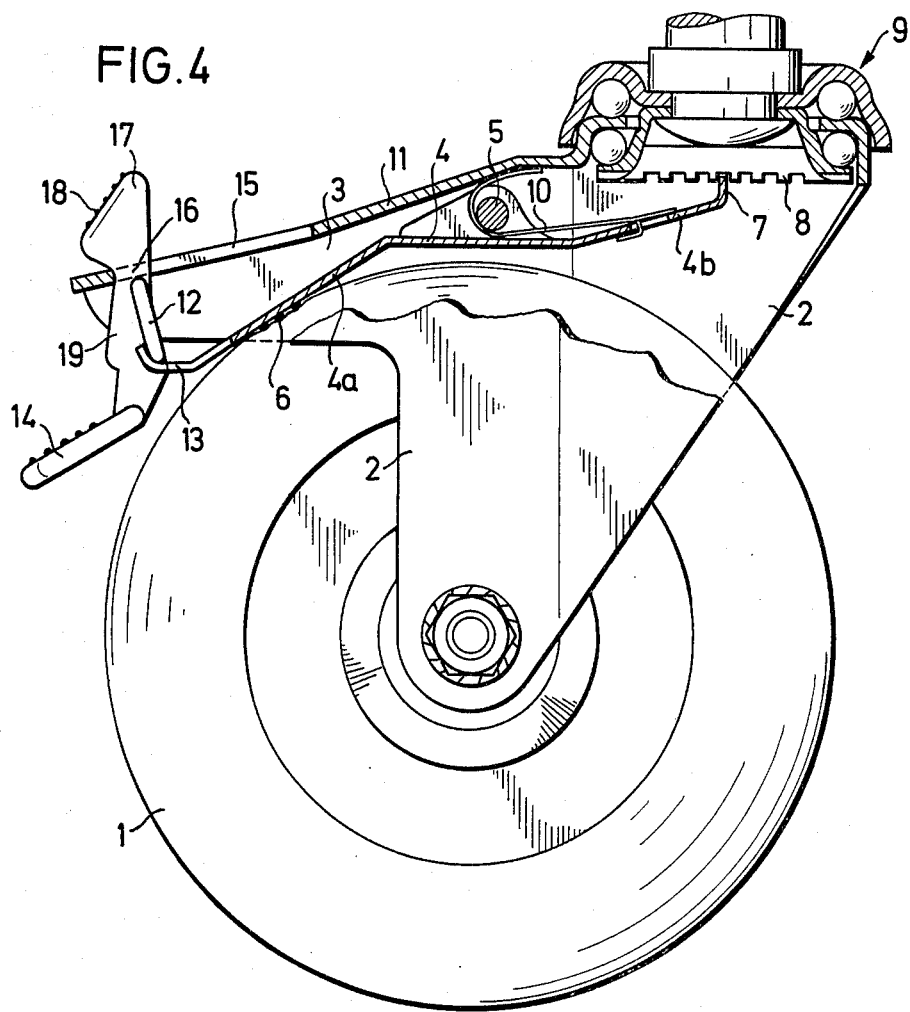
FIG. 4 is a partially sectioned view of the caster illustrated in FIG. 1 in the fully locked condition.
Figure 5:
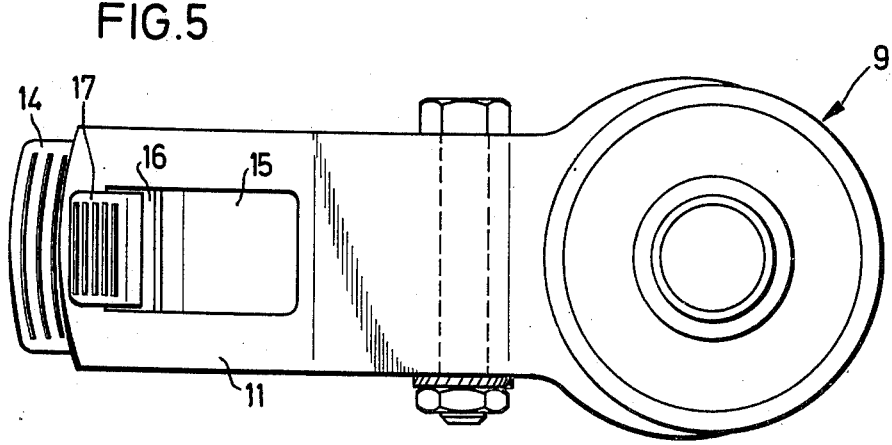
FIG. 5 is a plan view of the caster illustrated in FIG. 4.

The rear portion 11 of the caster-fork 2 is formed with a guide slot 15 in which the expanding toggle 12 is guided by a top guide lug 16. The guide lug 16 takes the form of a resetting cam 17 formed in this embodiment with ridges 18. In the locking position of the expanding toggle 12, in which the latter remains self-locked vertically directed upwards by exceeding the dead centre (FIG. 4), the resetting cam 17 extends out of the guide slot 15. In that case, it forms a foot-operated actuating cam which, when acted upon by the pressure of the tip of the foot, enables the expanding toggle 12 to be tilted back into its release position. To enable the expanding toggle 12 to tilt back of its own after the exertion of a slight pressure, the rear portion 11 of the caster-fork 2 is downwardly inclined on the trailing side of the caster, so that its guide slot 15 forms an inclined slideway for the resetting cam 17 to shoot back automatically into the release position of the expanding toggle 12.

Figure 2:
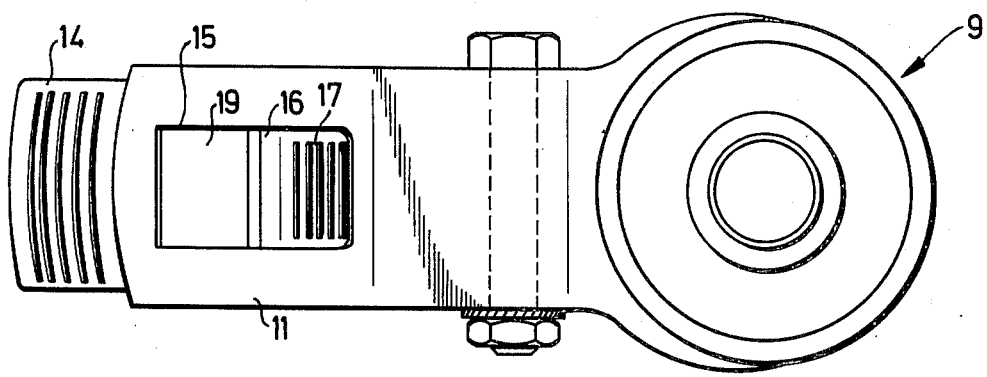
FIG. 2 is a plan view of the caster illustrated in FIG. 1.

The expanding toggle 12 taking the form of a foot-operated control lever 14 and its resetting cam 17 have a strip-like top thickened portion 19. When the expanding toggle 12 and the foot-operated control lever 14 are in the release position (FIG. 1), the strip-like thickened portion 19 fills and closes the guide slot 15 in the back portion 11 of the caster-fork 2, so that the guide slot 15 is protected from dirt and foreign bodies are prevented from entering the locking mechanism, and the caster has a pleasing appearance in the unlocked condition (FIG. 2).

I claim:

1. A lockable caster, which may be a swivel caster, having a running wheel rotatably mounted in a caster-fork and a locking device for locking the running wheel to prevent it from running and/or to prevent its caster-fork from swiveling, including locking means to engage with and lock the wheel and/or with a fixed ball bearing shell of the caster-fork to provide swivel locking, said locking device comprising an expanding toggle which is disposed in the cavity of the caster-fork, and which takes the form of a foot-operated control lever, and is pivotally mounted in a socket located in the hollow of the caster-fork below the fork back, the expanding toggle having a guide lug and the caster-fork having a guide slot, the guide lug being guided in the guide slot, the expanding toggle the guide lug and the control lever forming an unitary element pivotally mounted in said socket, characterized in that the guide slot is disposed in the rear portion of the caster-fork, and the guide lug takes the form of a resettling cam which in the locking position extends out of the guide slot to form a foot-operated cam provided for tilting the expanding toggle back into its release position.

2. A lockable caster as set forth in claim 1 characterised in that the expanding toggle and/or its resetting cam have a strip-like thickened portion which in the release position of the expanding toggle fills and closes the guide slot in the back portion of the caster-fork.

3. A lockable caster according to claim 1, wherein, on the trailing side of the caster, the expanding toggle is pivotally mounted below the fork back in a socket of a resilient or spring-loaded locking rocker, the fork back and locking rocker enclose the expanding toggle therebetween with prestressing.

4. A lockable caster as set forth in claim 3 characterised in that the expanding toggle and/or its resetting cam have a strip-like thickened portion which in the release position of the expanding toggle fills and closes the guide slot in the back portion of the caster-fork.

5. A lockable caster according to claim 3, wherein the back portion of the caster-fork is inclined downwards on the trailing side of the caster and its guide slot forms an inclined slideway over which the resetting cam can shoot back into the release position of the expanding toggle.

6. A lockable castor as set forth in claim 5, characterised in that the expanding toggle and/or its resetting cam have a strip-like thickened portion which in the release position of the expanding toggle fills and closes the guide slot in the back portion of the caster-fork.

7. A lockable caster according to claim 1, the locking means comprising a rocker pivotally mounted in the caster-fork, the rear portion of the rocker forming the socket in which the expanding toggle is pivotally mounted.

8. A lockable caster according to claim 7, the rocker having an arm for lockingly engaging the wheel or fixed ball bearing shell, or two arms for respectively lockingly engaging the wheel and the fixed ball bearing shell.

* * * * *

UNITED STATES PATENT AND TRADEMARK OFFICE
CERTIFICATE OF CORRECTION

PATENT NO. : 4,035,864
DATED : July 19, 1977
INVENTOR(S) : Klaus Dieter Schröder It is certified that error appears in the above-identified patent and that said Letters Patent are hereby corrected as shown below:

Column 1, line 16, change "The" (first occurrence) to --In--.

Column 2, line 44, change "expending" to --expanding--.

Column 3, line 56, change "rock" to --lock--.

Column 4, line 36, after "toggle" insert --,--.

Signed and Sealed this

Twenty-ninth Day of November 1977

[SEAL]

Attest:

RUTH C. MASON
Attesting Officer

LUTRELLE F. PARKER
Acting Commissioner of Patents and Trademarks